United States Patent
Krug et al.

(10) Patent No.: US 9,853,823 B2
(45) Date of Patent: Dec. 26, 2017

(54) APPLYING USER-SPECIFIED PERMISSIONS TO DISTRIBUTION OF CONTENT ITEMS TO SOCIAL NETWORKING SYSTEM USERS

(71) Applicant: Facebook, Inc., Menlo Park, CA (US)

(72) Inventors: Samantha P. Krug, San Francisco, CA (US); Kevin York Systrom, San Francisco, CA (US); Ryan Jacob Gomba, San Francisco, CA (US); Michel Krieger, San Francisco, CA (US); Hui Ding, Sunnyvale, CA (US); Ian McIntyre Silber, San Jose, CA (US); Peter Xiu Deng, Los Altos Hills, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/615,645

(22) Filed: Jun. 6, 2017

(65) Prior Publication Data
US 2017/0272262 A1 Sep. 21, 2017

Related U.S. Application Data

(62) Division of application No. 14/452,507, filed on Aug. 5, 2014.
(Continued)

(51) Int. Cl.
*H04L 29/06* (2006.01)
*H04L 12/18* (2006.01)
(Continued)

(52) U.S. Cl.
CPC .... *H04L 12/1813* (2013.01); *G06F 17/30699* (2013.01); *G06F 17/30861* (2013.01);
(Continued)

(58) Field of Classification Search
CPC ................. H04L 12/1813; H04L 63/08; G06F 17/30699; G06F 17/30861
(Continued)

(56) References Cited

U.S. PATENT DOCUMENTS 9,338,242 B1 10/2016 Suchland et al.
2002/0083136 A1 6/2002 Whitten
(Continued)

OTHER PUBLICATIONS

United States Office Action, U.S. Appl. No. 14/452,507, dated Aug. 12, 2016, 13 pages.
(Continued)

*Primary Examiner* — Syed Zaidi
(74) *Attorney, Agent, or Firm* — Fenwick & West LLP

(57) ABSTRACT

A social networking system user identifies one or more social networking system users authorized to present content items to the user via the social networking system ("authorized users"). When an additional user requests presentation of a content item to the user, the social networking system determines if the additional user is an authorized user. If the additional user is an authorized user, the content item is presented to the user. However, if the additional user is not an authorized user, the social networking system identifies the additional user to the user along with a request to identify the additional user as an authorized user. If the user identifies the additional user as an authorized user in response to the request, the content item is presented to the user.

17 Claims, 6 Drawing Sheets

Related U.S. Application Data

(60) Provisional application No. 61/915,446, filed on Dec. 12, 2013.

(51) Int. Cl.
*G06F 17/30* (2006.01)
*H04L 29/08* (2006.01)
*H04L 12/58* (2006.01)
*H04W 4/06* (2009.01)
*H04W 4/20* (2009.01)

(52) U.S. Cl.
CPC .............. *H04L 51/32* (2013.01); *H04L 63/08* (2013.01); *H04L 63/10* (2013.01); *H04L 65/403* (2013.01); *H04L 67/10* (2013.01); *H04L 67/22* (2013.01); *H04W 4/06* (2013.01); *H04W 4/206* (2013.01)

(58) Field of Classification Search
USPC ............................................. 726/4
See application file for complete search history.

(56) References Cited

U.S. PATENT DOCUMENTS

| | | |
|---|---|---|
| 2004/0015610 A1 | 1/2004 | Treadwell |
| 2004/0025057 A1* | 2/2004 | Cook .................. G06Q 10/107 726/28 |
| 2004/0215472 A1* | 10/2004 | Gleckman ............ G06Q 10/107 709/206 |
| 2005/0187809 A1* | 8/2005 | Falkenhainer ... G06Q 10/06311 705/7.13 |
| 2012/0278262 A1 | 1/2012 | Morgenstern et al. |
| 2012/0005224 A1 | 5/2012 | Ahrens et al. |
| 2013/0104080 A1 | 4/2013 | Bosworth et al. |
| 2014/0123237 A1 | 5/2014 | Gaudet et al. |
| 2015/0081783 A1 | 3/2015 | Gong et al. |
| 2015/0039424 A1 | 5/2015 | Narravula et al. |
| 2015/0172266 A1 | 6/2015 | Krug et al. |

OTHER PUBLICATIONS

United States Office Action, U.S. Appl. No. 14/452,507, dated Mar. 15, 2016, 14 pages.

* cited by examiner

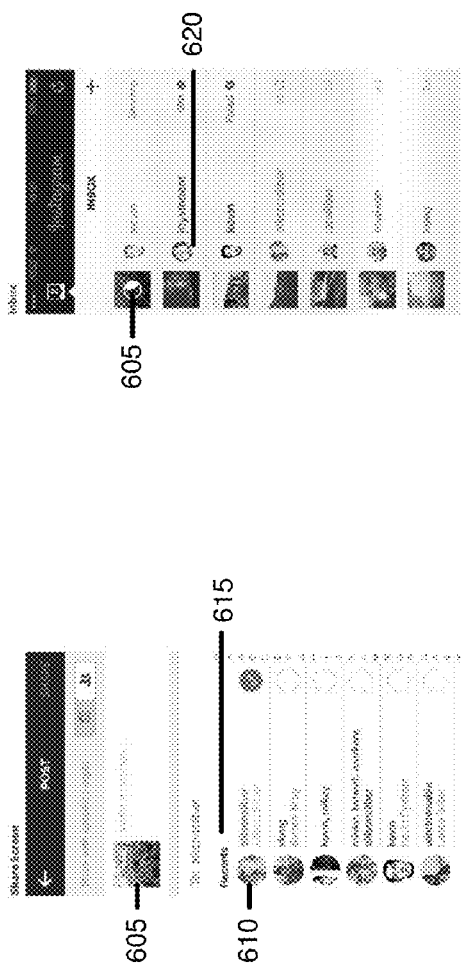
FIG. 6A
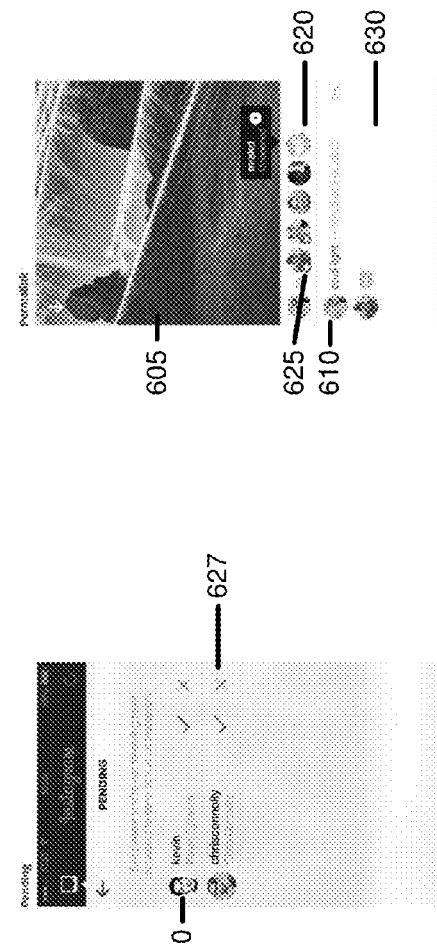
FIG. 6B
FIG. 6C
FIG. 6D

APPLYING USER-SPECIFIED PERMISSIONS TO DISTRIBUTION OF CONTENT ITEMS TO SOCIAL NETWORKING SYSTEM USERS

CROSS-REFERENCE TO RELATED APPLICATIONS

This application is a divisional of co-pending U.S. application Ser. No. 14/452,507, filed Aug. 5, 2014, which claims the benefit of U.S. Provisional Application No. 61/915,446, filed on Dec. 12, 2013, which are hereby incorporated by reference in their entirety.

BACKGROUND

This invention relates generally to presenting content items via a social networking system, and more specifically to selecting users of the social networking system to be presented with content items.

A social networking system allows its users to connect to and communicate with other social networking system users. For example, a social networking system allows a user to maintain content items, such as images, audio, or videos, and present the content items to other social networking system users. A social networking system user may establish a connection to other users, prompting the social networking system to present content items received from other users to the user, encouraging interaction between the various users.

However, many conventional social networking systems merely present a content item received from a user to other users connected to the user. Rather than allow the user to limit content item sharing, the social networking system shares the content item with every other user connected to the user. This distribution of the content item to each user connected to the user providing the content item may discourage subsequent interactions between users because of the widespread distribution of content items among users.

SUMMARY

A social networking system allows a user to specify a content item and identify one or more additional users of the social networking system to be presented with the content item. For example, the sender identifies a content item, such as an image or a video, and also identifies one or more social networking system receiving users to be presented with the content item. The social networking system maintains information identifying the sender, the content item, and the one or more recipients to be presented with the content item.

To allow a user to regulate sources from which content items are received, the social networking system maintains information identifying additional users of the social networking system that a user has authorized to present one or more content items to the user ("authorized users"). For example, the social networking system includes a user identifier corresponding to a user and one or more user identifiers of additional users that the user has authorized to present content items to the user or includes user identifiers of authorized users in a user profile associated with the user. The user may explicitly identify additional users authorized to present the user with a content item or may implicitly identify additional users authorized to present the user with a content item by establishing a connection to an additional user, by expressing a preference for a content item associated with an additional user, or performing another suitable action.

If an additional user of the social networking system requests to present a content item to the user, the social networking system determines whether the additional user is authorized by the user to present content items to the user based on stored information associated with the user. For example, the social networking system compares a user identifier of the additional user to user identifiers of authorized users associated with the user. If the additional user is authorized to present content items to the user, the content item from the additional user is included in an interface presenting content items from authorized users that is presented to the user. However, if the additional user is not authorized to present content items to the user, an interface identifying the additional user and including an option for the user to identify the additional user as an authorized user is generated and presented to the user. When the user is presented with the interface identifying the additional user, interacting with the option to identify the additional user as an authorized user allows the user to specify the additional user as an authorized user and view the content item requested for presentation by the additional user, as well as subsequent content items requested for presentation to the user by the additional user.

BRIEF DESCRIPTION OF THE DRAWINGS

FIG. 6A is an example user interface for identifying users of a social networking system to receive a content item, in accordance with an embodiment of the invention.

FIG. 6B is an example user interface for identifying content items received from an authorized user, in accordance with an embodiment of the invention.

FIG. 6C is an example user interface for identifying content items received by a user from one or more unauthorized users, in accordance with an embodiment of the invention.

FIG. 6D is an example user interface identifying social networking system users that interacted with a content item, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
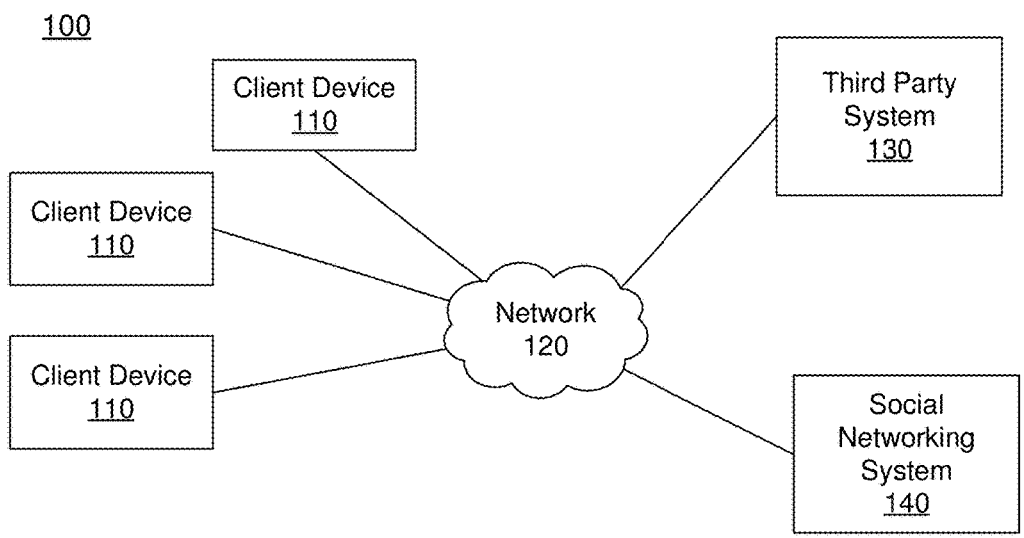
FIG. 1 is a block diagram of a system environment in which a social networking system operates, in accordance with an embodiment of the invention.

FIG. 1 is a block diagram of a system environment 100 for a social networking system 140. The system environment 100 shown by FIG. 1 comprises one or more client devices 110, a network 120, one or more third-party systems 130, and the social networking system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the social networking system 140. For example, a client device 110 executes a browser application to enable interaction between the client device 110 and the social networking system 140 via the network 120. In another embodiment, a client device 110 interacts with the social networking system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the social networking system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the social networking system 140, such as advertisements, content, or information about an application provided by the third party system 130.

Figure 2:
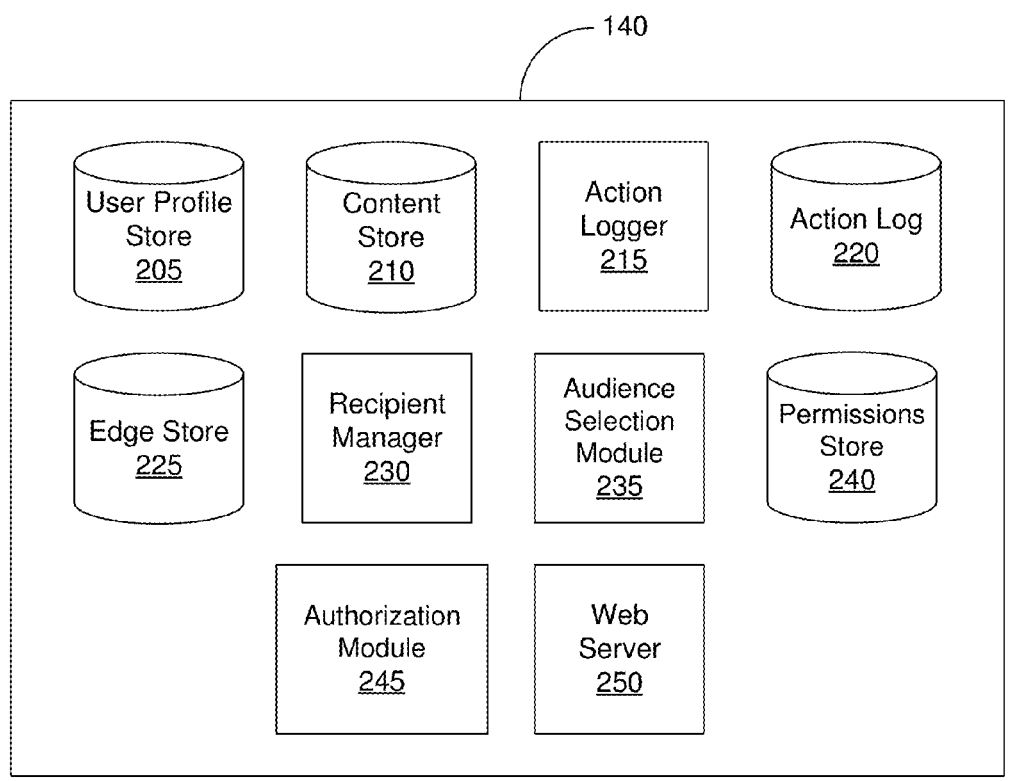
FIG. 2 is a block diagram of a social networking system, in accordance with an embodiment of the invention.

FIG. 2 is a block diagram of an architecture of the social networking system 140. The social networking system 140 shown in FIG. 2 includes a user profile store 205, a content store 210, an action logger 215, an action log 220, an edge store 225, a recipient manager 230, an audience selection module 235, a permissions store 240, an authorization module 245, and a web server 250. In other embodiments, the social networking system 140 may include additional, fewer, or different components for various applications. Conventional components such as network interfaces, security functions, load balancers, failover servers, management and network operations consoles, and the like are not shown so as to not obscure the details of the system architecture.

Each user of the social networking system 140 is associated with a user profile, which is stored in the user profile store 205. A user profile includes declarative information about the user that was explicitly shared by the user and may also include profile information inferred by the social networking system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the social networking system 140, user profiles may also be stored for entities such as businesses or organizations. This allows an entity to establish a presence on the social networking system 140 for connecting and exchanging content with other social networking system users. The entity may post information about itself, about its products or provide other information to users of the social networking system 140 using a brand page associated with the entity's user profile. Other users of the social networking system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a brand page, or any other type of content. Social networking system users may create objects stored by the content store 210, such as status updates, photos tagged by users to be associated with other objects in the social networking system, groups or applications. In some embodiments, objects are received from third-party applications or third-party applications separate from the social networking system 140. In one embodiment, objects in the content store 210 represent single pieces of content, or content "items." Each content item is associated with a content item identifier to simplify retrieval of the content item from the content store 210. Hence, social networking system users are encouraged to communicate with each other by posting text and content items of various types of media to the social networking system 140 through various communication channels. This increases the amount of interaction of among users and increases the frequency with which users interact within the social networking system 140.

The action logger 215 receives communications about user actions internal to and/or external to the social networking system 140, populating the action log 220 with information about user actions. Examples of actions include adding a connection to another user, sending a message to another user, uploading an image, reading a message from another user, and viewing content associated with another user. In addition, a number of actions may involve an object and one or more particular users, so these actions are associated with those users as well and stored in the action log 220.

The action log 220 may be used by the social networking system 140 to track user actions on the social networking system 140, as well as actions on third party systems 130 that communicate information to the social networking system 140. Users may interact with various objects on the social networking system 140, and information describing these interactions is stored in the action log 220. Examples of interactions with objects include: commenting on posts, sharing links, accessing content items, and any other suitable interactions. Additional examples of interactions with objects on the social networking system 140 that are included in the action log 220 include: commenting on a photo album, communicating with a user, establishing a connection with an object, joining a group, creating an event, authorizing an application, using an application, and expressing a preference for an object ("liking" the object). Additionally, the action log 220 may record a user's interactions with advertisements on the social networking system 140 as well as with other applications operating on the social networking system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the social networking system 140. For example, an e-commerce website may recognize a user of a social networking system 140 through a social plug-in enabling the e-commerce website to identify the user of the social networking system 140. Because users of the social networking system 140 are uniquely identifiable, e-commerce websites, such as in the preceding example, may communicate information about a user's actions outside of the social networking system 140 to the social networking system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the social networking system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 140, such as expressing interest in a page on the social networking system 140, sharing a link with other users of the social networking system 140, and commenting on posts made by other users of the social networking system 140.

In one embodiment, an edge may include various features each representing characteristics of interactions between users, interactions between users and objects, or interactions between objects. For example, features included in an edge describe a rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the social networking system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the social networking system 140 over time to approximate a user's interest in an object or another user in the social networking system 140 based on the actions performed by the user. A user's affinity may be computed by the social networking system 140 over time to approximate a user's interest for an object, interest, or other user in the social networking system 140 based on the actions performed by the user. Alternatively, an affinity score between users of the social networking system or between a user and an object maintained by the social networking system 140 may be received from a third party system 130, such as another social networking system 140, which determined an affinity score based on information maintained by the third party system 130 and associated with objects and/or users. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The recipient manager 230 maintains information associated with a user and a content item that identifies receiving users of the social networking system 140 to be presented with the content item by the social networking system 140. For example, the recipient manager associates a user identifier and a content item identifier with one or more user identifiers of receiving users to receive a content item associated with the content item identifier. In one embodiment, the user identifies the receiving users to be presented with a content item via a user interface or other suitable communication channel. Additionally, the recipient manager 230 retrieves information from the action log 220 describing interactions with a content item by one or more of the receiving users presented with the content item. Using the information retrieved from the action log 220, the recipient manager 230 generates information identifying interaction with a content item by one or more receiving users. For example, the recipient manager 230 generates an interface identifying receiving users presented with a content item and a type of interaction with the content item by each of the receiving users; the interface may be presented to a user that selected the content item for presentation to the additional user via a client device 110. Identifying interactions with a content item presented via the social networking system 140 is further described below in conjunction with FIG. 3.

In some embodiments, when a sending user identifies a content item to present to additional users of the social networking system 140, the audience selection module 235 retrieves information from the action log 220 and/or the edge store 225 describing the sending user's interaction with additional users of the social networking system 140. Examples of retrieved information describing the sending user's interaction with additional users of the social networking system include: a frequency with which the sending user interacts with an additional user, a duration from a current time with which the sending user interacted with an additional users, and a measure of affinity between the sending user and an additional user. Based on the retrieved information, the audience selection module 235 identifies one or more of the additional users as recommended users to be presented with the content item. For example, the audience selection module 235 ranks the additional users based on the user's prior interactions with the additional user and selects one or more additional users based on the ranking; the selected additional users are identified to the sending user as recommended users to be presented with the content item. As an additional example, the audience selection module 235 identifies users associated with the content item (e.g., users tagged in an image) and identifies the users associated with the content item as recommended users to be presented with the content item. Identifying users to be presented with a content item is further described below in conjunction with FIG. 4.

The permissions store 240 includes information identifying additional users of the social networking system 140 that a user has authorized to present one or more content items to the user ("authorized users"). For example, the permissions store 240 includes a user identifier corresponding to a receiving user and one or more user identifiers of additional users that the user has authorized to present content items to the user. Alternatively, additional users authorized to present content items to a user are identified in the user profile associated with user and included in the user profile store 205. Identifying additional users authorized to present content items allows a user to limit the potential sources of content items presented to the user. In various embodiments, the user may explicitly identify additional users authorized to present the user with a content item or may implicitly identify additional users authorized to present the user with a content item by establishing a connection to an additional user, by expressing a preference for a content item associated with an additional user, or performing another suitable action.

If an additional user of the social networking system 140 requests to present a content item to a user of the social networking system 140, the authorization module 245 determines whether the additional user is authorized by the user to present content items to the user based on information in the permissions store 240. For example, the authorization module 245 compares a user identifier of the additional user to user identifiers of authorized users associated with the user. If the additional user is authorized to present content items to the user, the authorization module 245 includes the content item from the additional user in an interface presenting content items from authorized users, and presents the interface to the user. However, if the additional user is not authorized to present content items to the user, the authorization module 245 generates an interface identifying the additional user and including an option for the user to identify the additional user as an authorized user. When the user is presented with the interface identifying the additional user, interacting with the option to identify the additional user as an authorized user allows the user to specify the additional user as an authorized user and view the content item requested for presentation by the additional user. Regulation of content item presentation to authorized users is further described below in conjunction with FIG. 5.

The web server 250 links the social networking system 140 via the network 120 to the one or more client devices 110, as well as to the one or more third party systems 130. The web server 250 serves web pages, as well as other content, such as JAVA®, FLASH®, XML, and so forth. The web server 250 may receive and route messages between the social networking system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, WEBOS® or BlackberryOS.

Figure 3:
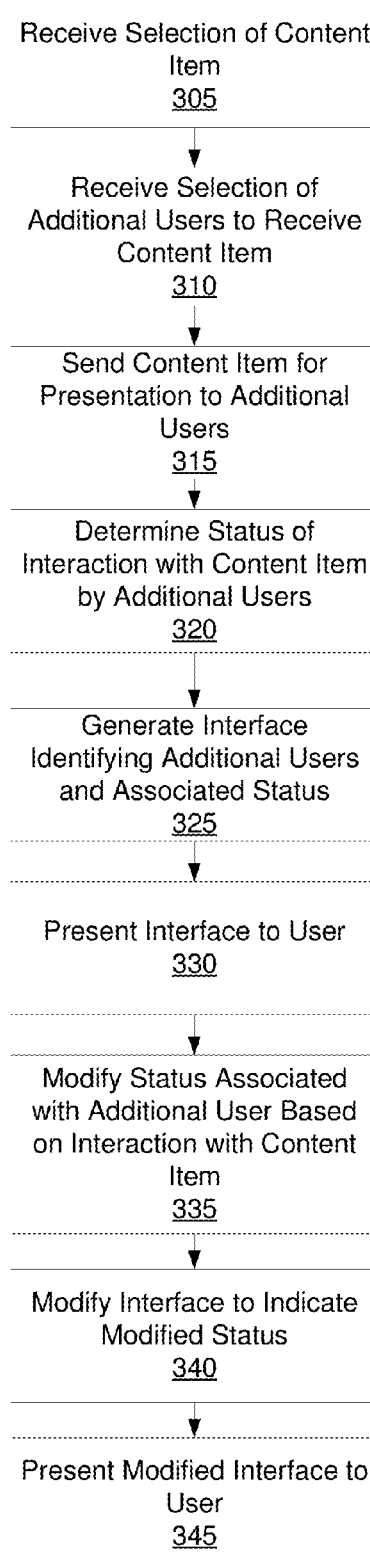
FIG. 3 is a flowchart of a method for identifying interaction with a content item presented to receiving users of a social network, in accordance with an embodiment of the invention.

Identifying Interaction with a Content Item Presented to Social Networking System Users FIG. 3 is a flowchart of one embodiment of a method for identifying interaction with a content item presented to social networking system users. In one embodiment, the process of FIG. 3 is performed by instructions encoded on a computer-readable storage medium of the social networking system 140 that, when executed by a processor, provide the functionality described in conjunction with FIG. 3. Additionally, in various embodiments, the method may include different and/or additional steps than those described in conjunction with FIG. 3.

The social networking system 140 receives 305 a selection of a content item from a user ("sending user") of the social networking system 140. For example, the sending user identifies a content item via a client device 110, which communicates information identifying the content item to the social networking system 140 via the network 120. In one embodiment, the social networking system 140 may identify various content items to the sending user via a client device 110, and the social networking system 140 receives 305 a selection of a content item from the client device 110. For example, the sending user selects a content item from a set of various content items selected by the social networking system 140 based on information in a user profile associated with the sending user, actions associated with the sending user, content items associated with the sending user, or other suitable information. The selected content item may be a content item stored by the social networking system 140 or the content item is included in the received selection and stored by the social networking system 140.

Additionally, the social networking system 140 receives 310 a selection of additional users ("receiving users") to receive the content item. For example, the sending user specifies one or more user identifiers associated with user profiles of social networking system users to be presented with the content item via specifying information to a client device 110 that is sent to the social networking system 140 via the network 120. In another embodiment, the social networking system 140 identifies one or more receiving users, allowing the sending user to select one or more of the receiving users to be presented with the content item. Identification of receiving users to receive a content item is described below in conjunction with FIG. 4. While FIG. 3 shows an embodiment where the social networking system 140 receives 310 the selection of receiving users after receiving 305 the selection of the content item, in alternative embodiments the social networking system 140 may receive 310 the selection of receiving users before receiving 305 the selection of the content item or may concurrently receive selections of the content item and the receiving users.

The social networking system 140 sends 315 the content item to client devices 110 associated with one or more of the selected receiving users. For example, the social networking system 140 sends a network address from which the content item is retrieved or communicates information describing the content item to the client devices 110, which present the content item. After sending 315 the content item for presentation to the receiving users, the social networking system 140 determines 320 a status describing at least one interaction with the content item by one or more of the receiving users. The status describes the interaction by the receiving user with the additional content item. For example, a status indicates whether a receiving user has viewed the content item, has expressed an affinity for the content item (i.e., "liked" the content item), hidden the content item, or otherwise interacted with the content item. Hence, a status associated with a receiving user is based on the type of interaction with the content item by the receiving user.

Based on the determined statuses associated with one or more receiving users, the social networking system 140 generates 325 an interface identifying the receiving users and the status associated with each receiving user. Alternatively, an application associated with the social networking system 140 executing on the client device 110 generates 325 the interface based on information describing the determined statuses that the client device 110 receives from the social networking system 140. In one embodiment, the social networking system 140 groups receiving users based on the type of interaction between the receiving users and the content item specified by the status associated with each receiving user. For example, the interface includes receiving users who have viewed the content item in one group and includes receiving users who have not viewed the content item in a different group. Furthermore, groups of receiving users may be presented in the interface based on a ranking associated with each group. In one embodiment, the ranking associated with a group of receiving users is based on a level of interaction with the content item associated with a type of interaction specified by a status associated with receiving users in the group. For example, a group of receiving users associated with a status indicating the receiving users in the group have interacted with the content item may be ranked higher than a group of receiving users associated with a status indicating the receiving users in the group not interacted with the content item. Receiving users in the higher-ranked group may be displayed in a more prominent position in the interface than receiving users in the lower-ranked group. Alternatively, the social networking system 140 may include receiving users in the generated interface in an order determined at least in part on a time associated with an interaction by a receiving user with the content item. For example, the interface is a ranked listing in which receiving users with more recent interactions with the content item have a higher position in the ranking than receiving users with less recent interactions with the content item. In another embodiment, the receiving users may be grouped based on the sending user's affinity with each receiving user. For example, the receiving users may be ranked so that interactions by receiving users with whom the sending user has a higher affinity may have a higher position in the ranking. Additionally, receiving users may be grouped based on the status associated with various receiving users, as described above, with receiving users in a group presented by the interface in an order based at least in part on a time associated with the receiving users' interactions with the content item, the sending user's affinity for the receiving users in the group, or any other suitable criteria.

Furthermore, the interface may distinguish different receiving users based on the status associated with the receiving users. For example, an image identifying a receiving user, such as a profile picture, may be presented along with an indication of the status associated with the receiving user (e.g., an image representing the interaction associated with the status, text describing the interaction associated with the status, etc.). Other user identifiers associated with different receiving users may be presented using different fonts, colors, sizes, or other characteristics based on the status associated with various receiving users. Additionally, user identifiers may be displayed in different regions on the interface based on the status associated with various users, so user identifiers are presented in different regions of the interface depending on the status associated with the user identifiers. The interface generated by the social networking system 140 is then communicated to a client device 110 for presentation 330 to the sending user.

When a receiving user interacts with the content item, the social networking system 140 modifies 335 the status associated with the receiving user. For example, when a receiving user views the content item, the status associated with the receiving user is modified 335 to indicate the receiving user has viewed the content item. As another example, when a receiving user that has viewed the content item expresses a preference for the content item, the status associated with the receiving user is modified 335 from indicating the receiving user viewed the content item to indicating the receiving user has expressed a preference for the content item.

When a status associated with the receiving user is modified 335, the social networking system 140 modifies 340 the interface to include the modified status and presents 345 the modified interface to the sending user. Alternatively, when a status associated with the receiving user is modified 335, information describing the modified status is communicated to the client device 110, where an application associated with the social networking system modifies 340 the interface to present the modified status. For example, the interface is modified in response to the social networking system 140 receiving an interaction with the content item from an additional user, causing the status associated with the receiving user to be modified 335. As a specific example, when a receiving user that has viewed the content item expresses a preference for the content item, the status associated with the receiving user is modified 335 from indicating the receiving user viewed the content item to indicating the receiving user has expressed a preference for the content item and the interface is modified 340 to identify the receiving user in a group of receiving users that have expressed a preference for the content item. The interface may be updated in real-time, at periodic intervals, in response to a user command, or based on any other suitable condition. This allows the interface to provide the sending user with a current indication of how additional users have interacted with the content item.

Additionally, the interface may encourage communication between the sending user and receiving users by allowing the users to discuss the content item. For example, the interface allows the sending user to identify a receiving user and send a request to establish a communication channel with the identified receiving user to the social networking system 140. For example, interacting with the interface allows the sending user to establish a communication channel with the receiving user via the social networking system 140 for transmitting text, audio, images, or video between the sending user and the receiving user, allowing the sending user to directly communicate with the receiving user. Communication between the sending user and the receiving user via this communication channel may be limited to the sending user and the receiving users, allowing private communication of information between the sending user and the receiving user.

Identifying Social Networking System Users to Receive a Content Item

Figure 4:
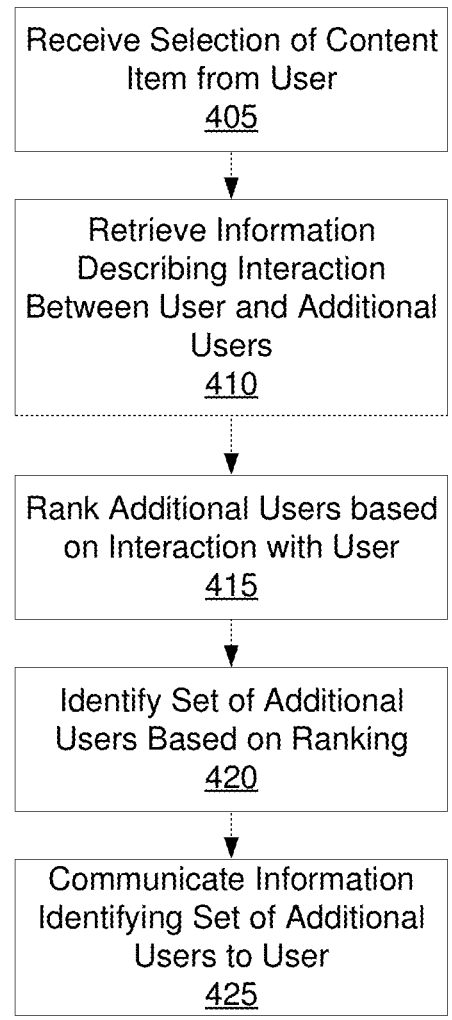
FIG. 4 is a flowchart of a method for identifying receiving users of a social networking system to receive a content item, in accordance with an embodiment of the invention.

FIG. 4 is a flowchart of one embodiment of a method for identifying receiving users of a social networking system 140 to receive a content item. In one embodiment, the process of FIG. 4 is performed by instructions encoded on a computer-readable storage medium of the social networking system 140 that, when executed by a processor, provide the functionality described in conjunction with FIG. 4. Additionally, in various embodiments, the method may include different and/or additional steps than those described in conjunction with FIG. 4.

The social networking system 140 receives 405 a selection of a content item from a user ("sending user") of the social networking system 140. For example, the sending user identifies a content item via a client device 110, which communicates information identifying the content item to the social networking system 140 via the network 120. In one embodiment, the social networking system 140 may identify various content items to the sending user via a client device 110, and the social networking system 140 receives 405 a selection of a content item from the client device 110. For example, the sending user selects a content item from a set of various content items selected by the social networking system based on information in a user profile associated with the sending user, actions associated with the sending user, content items associated with the sending user, or other suitable information.

The social networking system 140 retrieves 410 information describing a level of interaction between the sending user and one or more additional users of the social networking system 140. In one embodiment, the retrieved information describes interactions between the sending user and one or more additional users occurring within a specified time interval (e.g., occurred in the last 30 days) or interactions between the sending user and additional users that are associated with a location that is within a threshold distance of a location associated with the sending user. Alternatively, the retrieved information describes any interaction between the sending user and one or more additional users of the social networking system 140. In some embodiments, information associated with the content item is used when retrieving 410 information describing interactions between the sending user and one or more additional users include users associated with the content item (e.g., users tagged in the content item). While FIG. 4 shows an embodiment where the social networking system 140 retrieving 410 the information describing interaction between the sending user and one or more additional users after receiving 405 the selection of the content item, in alternative embodiments the social networking system 140 retrieves 410 the information before receiving the selection 410 of the content item.

Additional users are ranked 415 based on a level of interaction between the sending user and each additional user. For example, additional users are ranked based on the frequency with which the sending user interacts with each additional user. Additional users with which the sending user has a higher frequency of interaction have higher positions in the ranking. As another example, additional users are ranked based on affinities between the sending user and each additional user, where additional users with which the sending user has higher affinities having higher positions in the ranking. Furthermore, the additional users may be ranked based on the time of the last interaction with the sending user, where an additional user with which the sending user more recently interacted having a higher position in the ranking. Additionally, information associated with the selected content item may be used when ranking 415 the additional users. For example, a position in the ranking is increased for additional users associated with the content item (e.g., tagged in the content item) or having one or more characteristics matching or similar to characteristics of the content item (e.g., users associated with a location within a threshold distance of a location associated with the content item).

A set of one or more receiving users is identified 420 based at least in part on the ranking of additional users. For example, additional users with at least a threshold position in the ranking are identified 420 as receiving users. Alternatively, additional users having the highest positions in the ranking are identified 420 as receiving users. Alternatively, the social networking system 140 identifies 420 receiving users as users associated with the content item, such as additional users tagged in an image. In one embodiment, the client device 110 receives information describing the ranking and identifies 420 the set of one or more receiving users via an application associated with the social networking system 140 executing on the client device 110.

Information identifying the set of receiving users is communicated 425 from the social networking system 140 to a client device 110 associated with the sending user. The sending user may select one or more of the receiving users from the identifying information to communicate the selected content item to the selected one or more receiving users. By providing the sending user with a set of suggested receiving users, the social networking system 140 allows the sending user to more easily identify receiving users to be presented with a content item.

Regulating Presentation of Content Items Based on User Authorization

Figure 5:
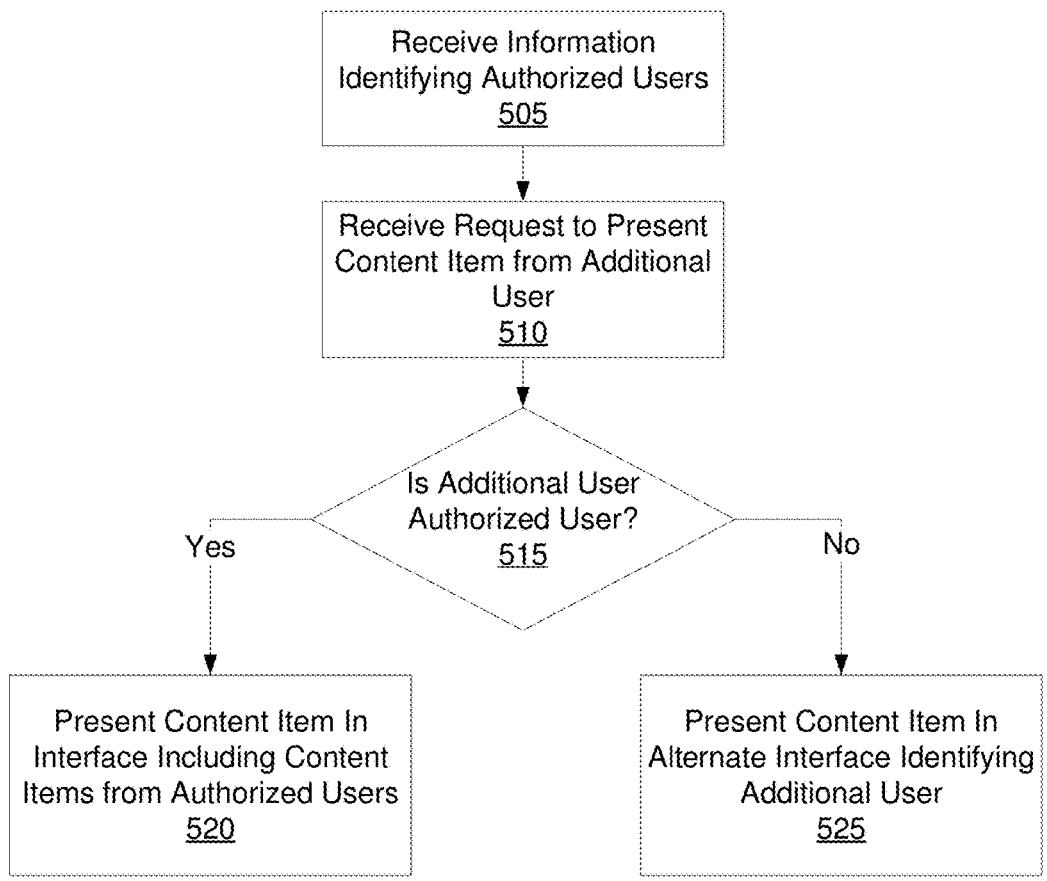
FIG. 5 is a flowchart of a method for regulating presentation of content items via a social networking system to content items associated with authorized users, in accordance with an embodiment of the invention.

FIG. 5 is a flowchart of one embodiment of a method for regulating presentation of content items via a social networking system 140 to content items associated with authorized users. In one embodiment, the process of FIG. 5 is performed by instructions encoded on a computer-readable storage medium of the social networking system 140 that, when executed by a processor, provide the functionality described in conjunction with FIG. 4. Additionally, in various embodiments, the method may include different and/or additional steps than those described in conjunction with FIG. 5.

The social networking system 140 receives 505 information from a user identifying one or more additional users authorized to present a content item to the user ("authorized users"). The user may expressly identify additional users authorized to present the user with content items. For example, the user specifies user identifiers for authorized users to the social networking system 140. Alternatively, information identifying authorized users is implicitly received 505 by the social networking system 140 based on the user's interactions with additional users via the social networking system 140. For example, a user may implicitly identify an additional user as an authorized user by sharing a content item with the additional user, establishing a connection on the social network with the additional user, expressing an affinity for (e.g., "liking") a content item associated with the additional user, or otherwise interacting with the additional user. The connection between the user and the additional user may be a bidirectional connection between the user and the additional user, a unidirectional connection between the user and the additional user (e.g., the user elects to "follow" content items associated with the additional user), or any other type of connection between the user and the additional user. Information identifying authorized users, such as a user identifier, is stored by the social networking system 140 and associated with the user, allowing subsequent identification of additional users authorized to present content items to the user. In one embodiment, user identifiers associated with authorized users are included in the user's user profile.

After receiving the information identifying authorized users, the social networking system 140 receives 510 a request from an additional user to present a content item to the user. The request includes information identifying the content item to be shared with the user and identifying the additional user. Based on the information included in the request, the social networking system 140 determines 515 whether the additional user is authorized to share the content item with the user. For example, the social networking system 140 compares the user identifier associated with the additional user to user identifiers associated with authorized users associated with the user. If the additional user's user identifier matches a user identifier of an authorized user associated with the user, the additional user is determined 515 to be an authorized user. In one embodiment, one or more user identifiers of additional users that the user has prohibited from interacting with the user (e.g., sharing a content item with the user) is associated with the user, and if the additional user is determined to be a user that is prohibited from interacting with the user, the request from the additional user to share content with the user is not presented to the user.

If the additional user is determined 515 to be an authorized user, the content item identified by the request is presented 520 to the user in a user interface including content items from authorized users for display to the receiving user. The user interface may be embodied as a visual feed. Alternatively, the interface includes information identifying content items from authorized users (e.g., links to the content items, descriptions of the content items). The user interface may also include information identifying authorized users associated with the content items. The interface is communicated 520 to a client device 110 to be presented to the user. In another embodiment, content items from an authorized user are included in a feed of content items presented to the user that presents content items from various authorized users to the user.

However, if the additional user's user identifier does not match an authorized user identifiers associated with the receiving user, the additional user is determined 515 not to be an authorized user, and the social networking system 140 withholds presentation of the content item to the user while generating an alternate interface, or a pending message interface, that is presented 525 to the receiving user. The alternate interface includes information identifying the additional user. For example, the alternate interface includes a name associated with the additional user, a user name associated with the additional user, a link to the additional user's profile, a description of a connection between the receiving user and the additional user, an image identifying the additional user (e.g., a profile picture), or other suitable information. Also, the alternate interface may include information describing the content item specified by the received request from the additional user, such as a time when the social networking system 140 received the request. In one embodiment, the social networking system 140 withholds presentation of the content item to the user and generates the alternate interface. The alternate interface is communicated to the client device 110, which presents 525 the alternate interface when the user requests to access the alternate interface (e.g., requests to view information about content items not delivered to the client device 110).

In one embodiment, the alternate interface is a visual feed that includes an option to authorize the social networking system 140 to present the content item identified by the request to the user. Additionally, the alternate interface may include an option to add the user identifier associated with the additional user to the set of user identifiers of authorized users associated with the user, allowing the receiving user to follow the additional user by receiving subsequent content items identified by the additional user for presentation to the receiving user. In one embodiment, the alternate interface displays the information describing the user from which the request was received for a specified time interval. For example, the option for the user to identify the additional user as an authorized user is presented for a specified time interval. After the specified time interval lapses, the additional user is not identified in the alternate interface until the social networking system 140 receives an additional request to present a content item to the user from the additional user. If the user interacts with the alternate information to identify the additional user as an authorized user or to authorize presentation of the content item, the social networking system 140 presents the content item to the user. Furthermore, additional options, such as blocking the additional user, may be presented via the alternate interface.

Example User Interfaces

FIG. 6A is an example user interface for identifying receiving users of a social networking system 140 to receive a content item. The user interface shown in FIG. 6A includes a content item 605 to be shared with receiving users and a listing 615 identifying a set of additional users. A user identifier 610 associated with each additional user is presented in the listing 615. The content item 605 displayed on the user interface is selected as described above in conjunction with FIG. 3. In various embodiments, the interface displays the content item in its entirety or the interface displays a portion of the content item (e.g., a thumbnail, a video or audio clip, or a still image). Furthermore, the interface may allow a sending user to specify add additional content, such as a caption, to the content item in the user interface; the additional content is presented to one or more selected receiving users along with the content item 605.

In various embodiments, the user identifier 610 is presented as a text description, as an image, or as any other suitable identifier. Additionally, the listing 615 includes information identifying each additional user in the set, such as a user name, a name, or any other suitable identifier. The listing 615 may present additional users identified by the social networking system 140 as described above in conjunction with FIG. 4. Furthermore, the listing 615 may identify additional users that have been selected to be presented with the content item 605. For example, the listing 615 includes a region including one or more additional users selected to be receiving users presented with the content item. As another example, the listing 615 identifies additional users selected to be presented with the content item 605 by overlaying an image (e.g., a check mark) or other visual indicator proximate the user identifiers 610 of the selected additional users.

FIG. 6B is an example user interface for identifying content items received from an authorized user. The user interface shown in FIG. 6B presents a listing 620 of content items received from authorized users, as described above in conjunction with the description of FIG. 5. The user interface shown in FIG. 6B includes information identifying a content item 605 and a user identifier 610 associated with the authorized user from which the content item 605 was received. The information identifying the content item 605 may be a link to a network address associated with the content item, a thumbnail, a still image, or other suitable information identifying the content item 605. Alternatively, the user interface may display the content item 605 received from the authorized user. The user identifier 610 identifies a user associated with the content item 605, such as the user who sent the content item. Content items 605 presented in the list 620 of the user interface may be grouped or ranked. For example, the content items 605 received form authorized users may be ordered in the list 620 so that content items 605 received more recently, content items that the user has not yet viewed, or content items with which the user has a higher affinity are displayed in a higher position in the list 620. Content items 605 may also be presented in the list 620 based on based on attributes of the user that sent the content item 605. For example, content items 605 may be ranked based on the user's affinity for the user that requested the content item 605 be presented to the user. In another example, the user specifies that content items 605 received from one or more identified users are presented in the listing 620. In one embodiment, the listing 620 visually distinguishes content items that the user has previously viewed from content items that the user has not previously viewed, and may present content items in a chronological order, in an order based on the user that requested presentation of content items to the user, or based on any other suitable ordering.

FIG. 6C is an example of an alternate user interface for identifying content items received by a user from one or more unauthorized users. The alternate interface shown in FIG. 6C includes a list 625 of user identifiers 610 associated with users that a user has not authorized to present content items to the user. Hence, the alternate user interface is generated as described above in conjunction with FIG. 5. The user identifier 610 displayed on the alternate interface is displayed in conjunction with one or more options 627. For example, an option 627 allows the user to identify an additional user requesting to present a content item to the user as an authorized user. An option 627 for the user to decline being presented with the content item from the additional user may also be presented.

FIG. 6D is an example user interface identifying social networking system users who interacted with a content item. The interface is presented to the user, as described above in conjunction with FIG. 3. In the example of FIG. 6D, the interface includes a content item 605, the user identifier 610 of one or more additional users, a listing 630 of additional users presented with the content item 605, a status 635 associated with one or more additional users. The listing 630 display user identifiers associated with additional users that were presented with the content item 605, such as user names, profile images, or other user identifiers associated with the additional users. The status 635 associated with an additional user describes a type of interaction between the additional user and the content item 605; in the example of FIG. 6D, an image representing the type of interaction is presented proximate to the user identifier of an additional user. For example, the status 635 associated with the additional user is overlaid on the user identifier 610 associated with the additional user. However, the status 635 may also be represented as text or other suitable information. Furthermore, additional statuses 635 may be included in the interface. For example, an additional status indicting whether the associated receiving user is online may also be overlaid on the user identifier 610. In the example of FIG. 6D, the interface also includes a communication channel 640, allowing the user presented with the interface to communicate text, video, audio, or other data to an additional user identified from the listing 630 or otherwise identified. In one embodiment, information communicated from the user to the additional user via the communication channel is kept private from other users.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    receiving a request, from a user of a networking system, to send a content item to an additional user via the networking system, the user neither connected to the additional user on the networking system nor receiving content items posted by the additional user on a third party system;
    determining whether the user is an authorized user to send one or more content items to the additional user based on information associated with the additional user by the networking system, the information comprising one or more of:
        information describing an interaction between the additional user and another user of the networking system, and
        information describing actions the additional user performed on the third party system;
    responsive to determining the user is not an authorized user, withholding sending of the content item to the additional user;
    generating a pending message interface identifying the user and a request to identify the user as an authorized user; and
    communicating the generated pending message interface to a client device for presentation to the additional user.

2. The computer-implemented method of claim 1, wherein the information associated with the additional user by the networking system comprises one or more user identifiers associated with one or more authorized users of the networking system.

3. The computer-implemented method of claim 1, wherein the interaction comprises establishing a connection between the additional user and the other user via the networking system.

4. The computer-implemented method of claim 1, wherein the interaction is selected from a group consisting of: sharing an additional content item with the other user, expressing an affinity for a content item associated with the other user, and any combination thereof.

5. The computer-implemented method of claim 1, further comprising:
    sending the content item to the additional user in response to receiving a response to the request that identifies the user as the authorized user.

6. The computer-implemented method of claim 5, further comprising:
    storing information identifying the user as authorized to send content items to the additional user in response to receiving the response to the request that identifies the user as the authorized user.

7. A computer program product comprising a non-transitory computer readable medium having instructions encoded thereon that, when executed by a processor, cause the processor to:
    receive a request from a user of a networking system to send a content item to an additional user via the networking system, the user either not connected to the additional user on the networking system or not receiving content items posted by the additional user on a third party system;
    determine whether the user is an authorized user to send one or more content items to the additional user based on information associated with the additional user by the networking system, the information comprising one or more of:
        information describing an interaction between the additional user and the other user of the networking system, and
        information describing actions the additional user performed on a third party system;
    responsive to determining the user is not an authorized user, withhold sending of the content item to the additional user;
    generate a pending message interface identifying the user and a request to identify the user as an authorized user; and
    communicate the generated pending message interface to a client device for presentation to the user.

8. The computer program product of claim 7, wherein the information associated with the additional user by the networking system comprises one or more user identifiers associated with one or more authorized users of the networking system.

9. The computer program product of claim 7, wherein the interaction comprises establishing a connection between the additional user and the other user via the networking system.

10. The computer program product of claim 7, wherein the computer readable storage medium further has instructions encoded thereon that, when executed by the processor, cause the processor to:
    send the content item to the additional user in response to receiving a response to the request that identifies the user as the authorized user.

11. The computer program product of claim 10, wherein the computer readable storage medium further has instructions encoded thereon that, when executed by the processor, cause the processor to:
    store information identifying the user as authorized to send content items to the additional user in response to receiving the response to the request that identifies the user as the authorized user.

12. A computer system comprising:
    a computer processor; and
    a non-transitory computer readable storage medium comprising storage instructions that when executed by the computer processor perform actions comprising:
        receiving a request, from a user of a networking system to send a content item to an additional user via the networking system, the user either not connected to the additional user on the networking system or not receiving content items posted by the additional user on a third party system;

determining whether the user is an authorized user to send one or more content items to the additional user based on information associated with the additional user by the networking system, the information comprising one or more of:
  information describing an interaction between the additional user and the other user of the networking system, and
  information describing actions the additional user performed on a third party system;
responsive to determining the user is not an authorized user, withholding sending of the content item to the additional user;
generating a pending message interface identifying the user and a request to identify the user as an authorized user; and
communicating the generated pending message interface to a client device for presentation to the additional user.

13. The computer system of claim 12, wherein the information associated with the additional user by the networking system comprises one or more user identifiers associated with one or more authorized users of the networking system.

14. The computer system of claim 12, wherein the interaction comprises establishing a connection between the additional user and the other user via the networking system.

15. The computer system of claim 12, wherein the interaction is selected from a group consisting of: sharing an additional content item with the other user, expressing an affinity for a content item associated with the other user, and any combination thereof.

16. The computer system of claim 12, the actions further comprising:
  sending the content item to the additional user in response to receiving a response to the request that identifies the user as the authorized user.

17. The computer system of claim 16, the actions further comprising:
  storing information identifying the user as authorized to send content items to the additional user in response to receiving the response to the request that identifies the user as the authorized user.

* * * * *